US007151503B2

(12) United States Patent
Noro et al.

(10) Patent No.: US 7,151,503 B2
(45) Date of Patent: Dec. 19, 2006

(54) ANTENNA UNIT

(75) Inventors: Junichi Noro, Akita (JP); Kenichi Taguchi, Akita (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/785,936

(22) Filed: Feb. 26, 2004

(65) Prior Publication Data

US 2004/0266345 A1 Dec. 30, 2004

(30) Foreign Application Priority Data

Jun. 26, 2003 (JP) ........................ P. 2003-181979

(51) Int. Cl.
*H04M 3/16* (2006.01)

(52) U.S. Cl. ...................... 343/872; 343/872; 343/841; 455/13.3; 455/19; 455/25

(58) Field of Classification Search ................ 343/872, 343/841, 13.3, 19, 25
See application file for complete search history.

(56) References Cited

U.S. PATENT DOCUMENTS 5,247,270 A * 9/1993 Harman et al. ............. 333/237
5,585,806 A * 12/1996 Ogino et al. ......... 343/700 MS
5,972,139 A * 10/1999 Chu ............................ 156/84
6,384,791 B1 * 5/2002 Ikeda et al. ................. 343/713
6,552,688 B1 * 4/2003 Yoshimi ..................... 343/702
6,690,335 B1 * 2/2004 Onishi et al. ............... 343/872
2004/0160377 A1 * 8/2004 Aisenbrey ................... 343/789

FOREIGN PATENT DOCUMENTS

JP 7-42524 8/1995
JP 2003-17154 1/2003

* cited by examiner

*Primary Examiner*—Wilson Lee
*Assistant Examiner*—Binh Van Ho
(74) *Attorney, Agent, or Firm*—Whitham, Curtis, Christofferson & Cook, P.C.

(57) ABSTRACT

An antenna unit has a coaxial cable firmly connected and fixed to an antenna substrate by an easy soldering process and provides freedom in pattern formation and mounting of parts on the antenna substrate. The antenna unit includes an antenna substrate on which an antenna element and antenna circuit parts are mounted, and on which a power supply pattern or a ground pattern is formed. A shield case is attached to the antenna substrate so as to cover the mounted parts. A nearly C-shaped notch is formed on the main surface of the shield case opposed to the antenna substrate to form a tongue piece-shaped hold-solder part. A coaxial cable is connected to a connection part formed on the antenna substrate and led from a lead part formed on a side surface of the shield case.

10 Claims, 5 Drawing Sheets

ANTENNA UNIT

BACKGROUND OF THE INVENTION

1. Field of the Invention

The present invention relates to a satellite signal receiving antenna unit for receiving radio waves from an earth satellite, and particularly to a satellite signal receiving antenna unit for receiving radio waves circularly polarized such as satellite radio broadcasting.

2. Description of the Related Art

The satellite signal receiving antenna unit is set on a moving machine such as an automobile or a ship. A GPS antenna unit which, upon reception of a signal of gigahertz band transmitted from a satellite, detects the latitude and longitude thereby to obtain the present position data, and a satellite radio receiving antenna unit which receives radio broadcasting has been known as the satellite signal receiving antenna units. The satellite signal receiving antenna unit is combined with a reception unit and a signal processing unit.

In the satellite broadcasting receiving antenna unit, an antenna body is generally housed in a resin-made case, and a coaxial cable connected to the antenna body is led from the case and connected to a reception unit. The antenna unit comprises members such as an antenna body and a shield case. The antenna body comprises an antenna element, and an antenna substrate on which antenna circuit parts such as an amplifier are mounted and the predetermined circuit patterns such as a power supply pattern and a ground pattern are formed. The shield case is attached to this antenna substrate so as to cover the mounted circuit parts, thereby performing as an electromagnetic shield.

Since the satellite signal receiving antenna unit is set to the moving machine such as the automobile to be used, the coaxial cable is firmly fixed onto the antenna substrate to hold vibration-resistance and shock-resistance. Therefore, on the side surface of the shield case from which the coaxial cable is led, a cable holding part is formed integrally, and when the shield case is attached to the antenna substrate, the cable holding part presses the coaxial cable on the antenna substrate, whereby shielding of the mounted circuit parts and holding of the coaxial cable are performed. (For example, JP-UM-A-7-42524 or JP-A-2003-17154)

In the above conventional satellite signal receiving antenna unit, the cable holding part is formed on the side surface of the shield case from which the coaxial cable is led. In a case where the coaxial cable is soldered to each connection pattern formed in the inner position of the antenna substrate which is distant from the holding position by the cable holding portion, soldering is performed in a state where a lead wire of the coaxial cable comes up from the connection pattern. That is, aerial soldering is performed, so that it becomes difficult to perform the connection with enough strength.

Therefore, since it is necessary to perform soldering while the lead wire of the coaxial cable is being pressed on the connection pattern of the antenna substrate by use of an appropriate jig, working performance becomes a problem. Further, since stress is concentrated on the soldering portion, peeling-off of solder is also produced thereby to cause a problem that reliability lowers the solder can peel off, thereby decreasing reliability.

For example, in order to prevent aerial soldering, it is thought that the connection pattern of the antenna substrate is formed in the vicinity of the lead part of the coaxial cable thereby to bring the soldering part close to the holding position by the cable holding portion. However, since freedom in pattern formation and mounting of parts on the antenna substrate is limited, it is difficult to realize size-reduction and improvement of assembly performance.

SUMMARY OF THE INVENTION

Accordingly, it is an object of the invention to provide an antenna unit in which a coaxial cable is firmly connected and fixed to an antenna substrate by an easy soldering process, resulting in freedom of pattern formation and improvement of mounting parts on the antenna substrate.

In order to achieve the above object, an antenna unit according to the invention comprises an antenna substrate on which an antenna element and antenna circuit parts are mounted and a power supply pattern or a ground pattern is formed; a shield case which is attached to the antenna substrate so as to cover the mounted parts, in which a nearly C-shaped notch is formed on its main surface opposed to the antenna substrate thereby to form a tongue piece-shaped hold-solder part; and a coaxial cable which is connected to a connection part formed on the antenna substrate and led from a lead part formed on a side surface of the shield case.

In the thus constructed antenna unit according to the invention, the shield case is attached to the antenna substrate in which the coaxial cable is soldered and connected to the connection part an as to cover the mounted parts, whereby the coaxial cable is led from the lead part of the shield case. According to this antenna unit, since the hold-solder part presses the coaxial cable in the vicinity of the soldering portion and soldering is performed, the coaxial cable is firmly fixed to the shield case. Further, according to the antenna unit, the coaxial cable can be firmly connected by an easy process to the antenna substrate having the connection part in the free position on its main surface, so that reliability improves and cost can be reduced.

DESCRIPTION OF THE PREFERRED EMBODIMENTS

Figure 1:
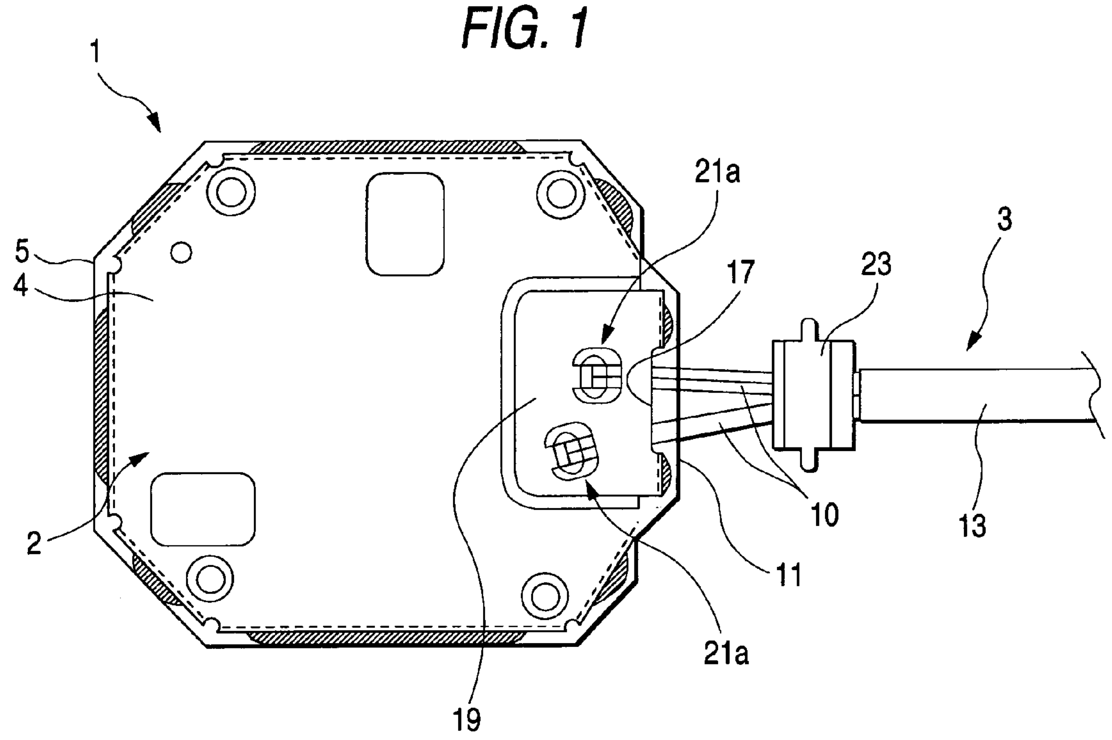
FIG. 1 is a plan view or a satellite signal receiving antenna unit shown as an embodiment of the invention.
Figure 2:
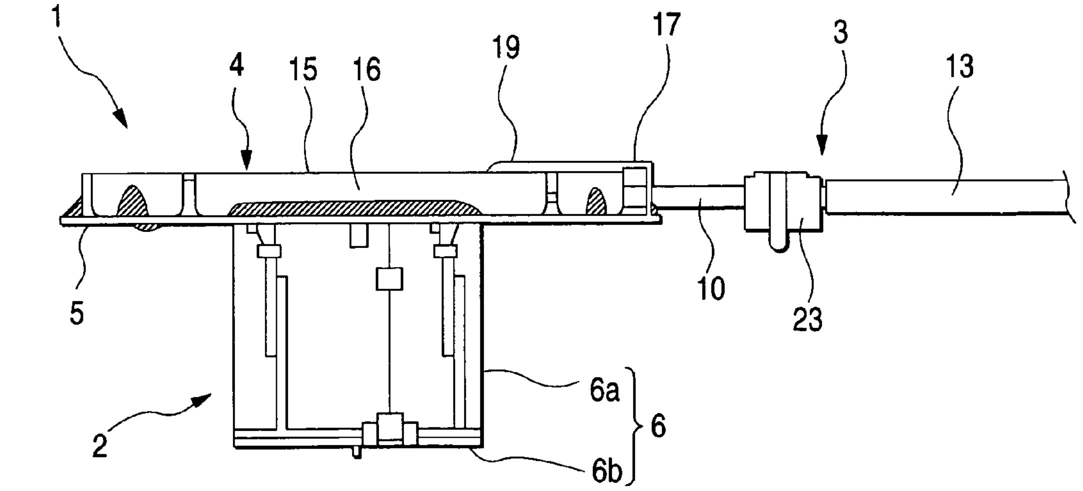
FIG. 2 is a side view of the antenna unit.

An embodiment of the invention will be described below in detail with reference to drawings. An antenna unit 1 shown as the embodiment is a satellite radio receiving antenna, which is set on a moving machine such as an automobile or a ship, and receives a satellite signal transmitted from a satellite to receive radio broadcasting. The antenna unit 1, as shown in FIGS. 1 and 2, includes an antenna body 2, a coaxial cable unit 3, and a shield case 4, and these component members are included in an armored case (not shown) comprising an upper case and a base plate which are made of resin.

Figure 6:
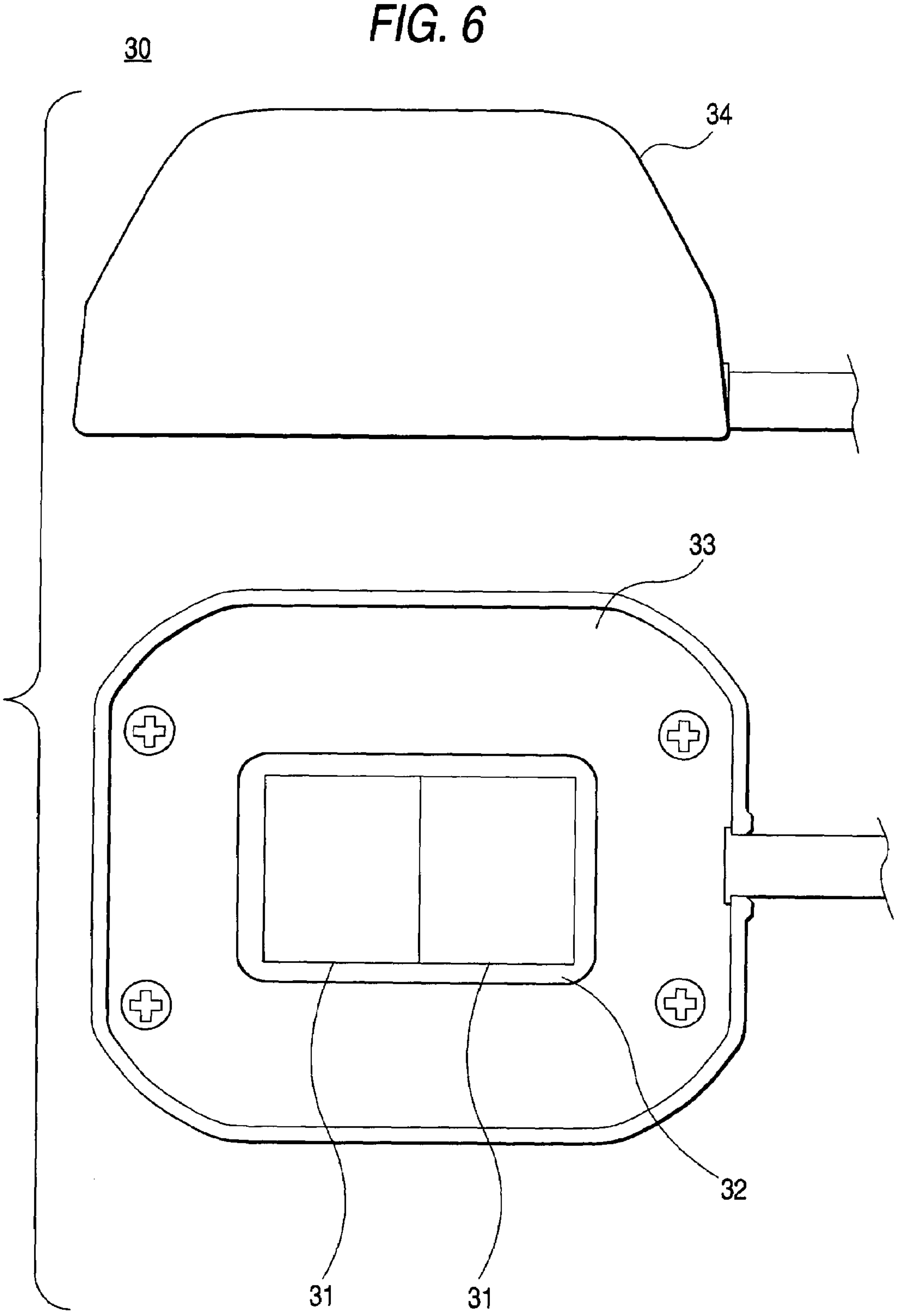
FIG. 6 is a side view and a bottom view of an armored case in which the antenna unit is housed.

The antenna unit 1, as shown in FIG. 6, is housed in an armored case 30 comprising a top cover 34 and a base plate 33, and set onto an automotive roof through an attachment formed on the base plate 33. The attachment comprises two magnets 31 which are arranged in a row in a recess 32 provided nearly in the center of the base plate 33 and recessed. Accordingly, the antenna unit is held and fixed on the automotive roof by magnetic power. The antenna unit 1 is connected through the coaxial cable unit 3 to a reception unit set in a car interior, and the satellite signal received by the antenna body 2 is supplied to the reception unit thereby to perform the predetermined treatment.

Figure 3:
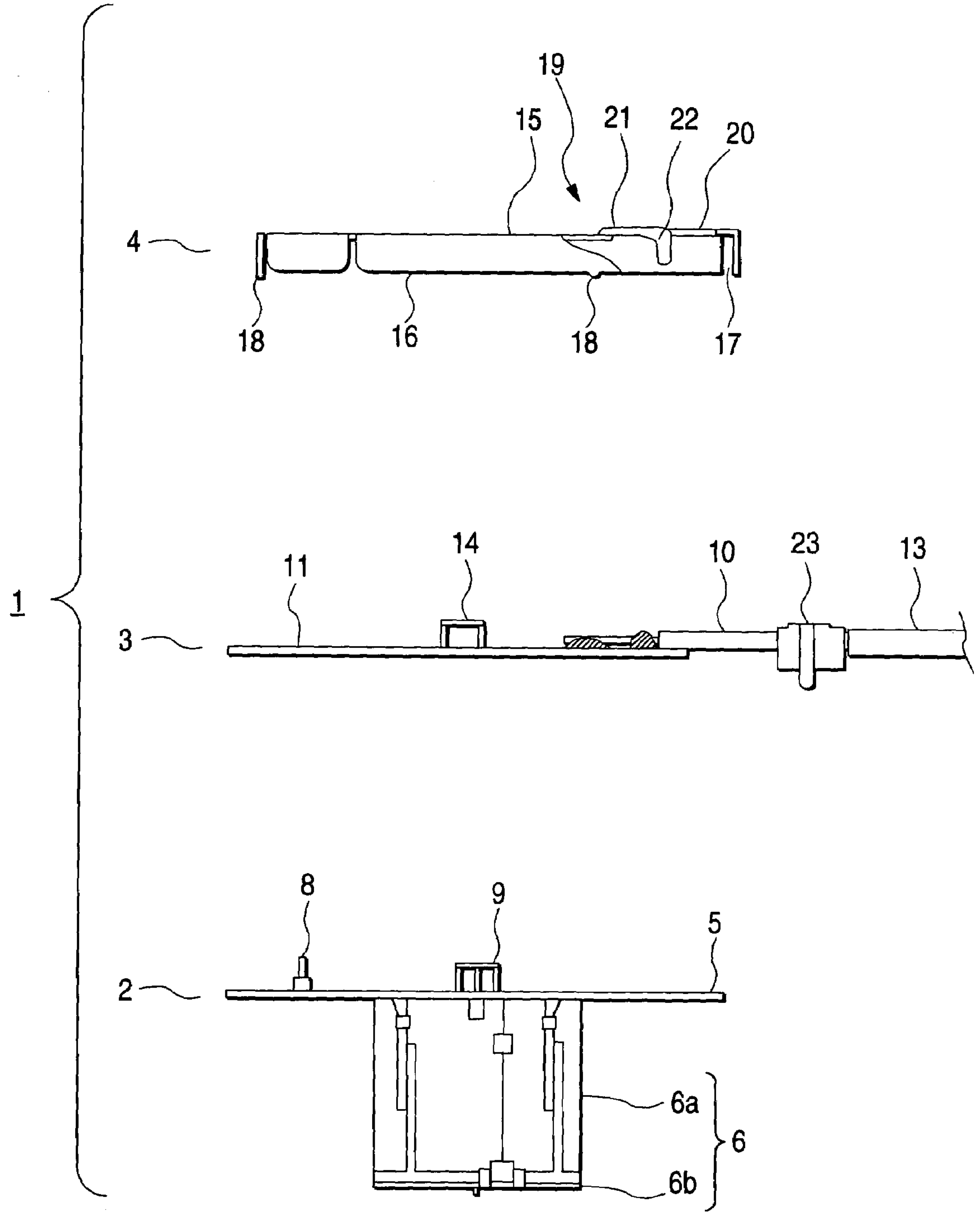
FIG. 3 is an exploded side view or the antenna unit.

The antenna body 2 comprises an antenna substrate 5 and an antenna element 6 mounted on this antenna substrate 5. The antenna substrate 5 is formed nearly in the shape of an octagon as a whole, and attachment holes into which screws for attaching the antenna into the armored case are screwed, which are not shown, are formed in plural positions at its periphery on the antenna substrate 5, a circuit pattern, a power supply pattern, or a ground pattern is formed though its details are omitted. In the antenna substrate 5, plural positioning holes for positioning and attaching the shield case 4 thereby to perform soldering are formed, which will be described later in detail. For the antenna substrate 5, as shown in FIG. 3, a power supply pin 8 and an earth terminal member 9 for positioning and attaching the coaxial cable unit 3 are provided.

The antenna element 6 comprises a fluorocarbon resin block 6*a* and a loop antenna 6*b* which forms a copper foil pattern having the predetermined shape on the upper surface of this resin block 6*a*. In a state where a bottom surface of the resin block 6*a* is soldered onto a main surface of the antenna substrate 5 and the loop antenna 6*b* is located upward (in FIG. 2, the loop antenna 6*b* is located downward), the antenna element 6 is mounted on this antenna substrate 5.

The antenna substrate 5 is connected to an output terminal or the coaxial cable unit 3, of which details are omitted, whereby the coaxial cable unit 3 is combined with the antenna body 2. The coaxial cable unit 3 comprises a coaxial cable 10, a cable substrate 11, and a protective tube 13. The axial cable 10, of which details are omitted, comprises a core wire, an inner layer insulator made of resin which covers this core wire, a mesh-shaped shield wire which is provided at the periphery of this inner layer insulator, and an exterior insulator which covers this shield wire.

On the cable substrate 11, an output terminal portion, a connection terminal portion opposed to the terminal portion or the antenna substrate 5, or a conductive portion which connects these terminal portions, of which details are omitted, is formed with an appropriate pattern. In the cable substrate 11, a fitting hole, of which details are omitted, is provided opposed to the power supply pin a on the antenna substrate 5 side, and an earth spring 14 is mounted on the cable substrate 11, opposed to the earth terminal member 9. On the cable substrate 11, antenna circuit parts such as an amplifier and a filter are mounted though their details are omitted. The cable substrate 11 constitutes a high-frequency reception circuit board by these electronic parts and passive elements.

Regarding the coaxial cable 10, two axial cables are bound integrally by the protective tube 13, which facilitates in cable handling and reduces the problems discussed above. The protective tube 13 is composed of a resin tube having thermal shrinkage characteristic such as a vinyl chloride tube, and covers the coaxial cable 10 led to the outside of the armored case from a bush 23 which is attached correspondingly to the lead position and made of resin material. The protective tube 13 is heated in a state where it is inserted to the predetermined position thereby to shrink, and it is fixed onto the peripheral portion of the coaxial cable 10. This results in the prevention of damage to the coaxial cable 10 at the lead portion from the armored. It is preferable that when the antenna unit is attached onto a moving machine such as an automobile, the protective tube 13 covers a portion of the coaxial cable 10 exposed to the outside from the moving machine, that is, a portion of about 15 to 20 cm from the coaxial cable leading position of the armored case.

The protective tube 13 is much cheaper than a conventional rubber-made cover member used for protecting the coaxial cable, and can cover the coaxial cable more readily.

In the coaxial cable unit 3, the core wire and the shield wire which have been exposed by peeling the inner layer insulator and the exterior insulator of the coaxial cable 10 are respectively soldered to output terminal portions formed on the cable substrate 11. In the coaxial cable unit 3, while the core wire and the shield wire are being pressed on the corresponding output terminal portions, they are soldered to the output terminal portions, whereby the coaxial cable 10 is connected to the cable substrate 11 without coming up from the cable substrate 11.

The cable substrate 11 in the coaxial cable unit 3 to which the coaxial cable 10 has been connected is combined with the antenna substrate 5. The cable substrate 11 and the antenna substrate 5 are combined in a state where their positions are fitted to each other by causing the power supply pin 8 to pass through the fitting hole opposed to the pin 8 and connecting the earth terminal member 9 to the earth spring. The power supply pin 8 and the earth terminal member 9 are soldered, whereby the cable substrate 11 and the antenna substrate 5 are integrated electrically and mechanically. Hereby, in the antenna unit 1, the antenna body 2 and the coaxial cable unit 3 are integrated.

Figure 4:
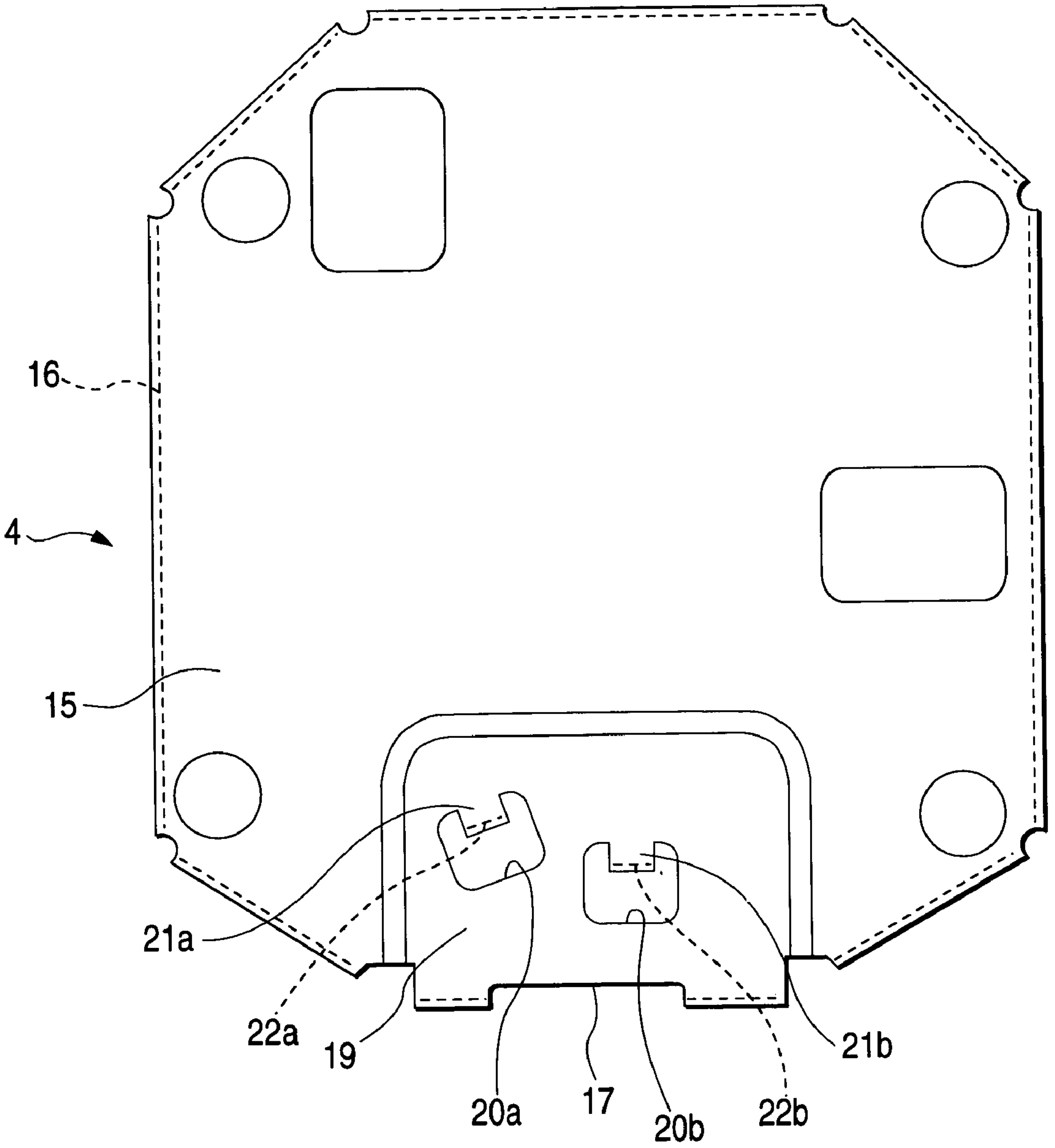
FIG. 4 is a plan view of a shield case.
Figure 5:
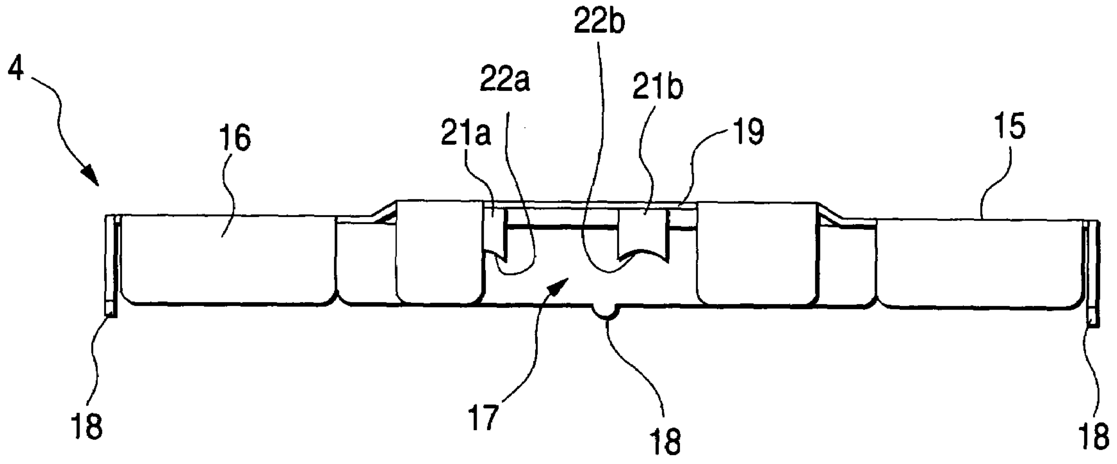
FIG. 5 is a side view of the shield case.

The shield case 4 is formed, as shown in FIGS. 4 and 5, in the shape of a nearly octagonal thin box as a whole by pressing a metallic thin plate. In the shield case 4, around a main surface portion 15, a side surface portion is formed with such a height that the side surface portion 16 does not come into contact with the electronic parts mounted on the cable substrate 11. In the shield case 4, a cable leading part 17 from which the coaxial cable 10 is led in a state where the shield case 4 has been attached to the antenna body 2 is opened at a part or the side surface portion 16. In the shield case 4, as shown in FIG. 5, plural positioning protrusions 18 which are opposed and fitted to the positioning holes formed in the antenna substrate 5 and the cable substrate 11 are formed at a leading end of the side surface portion 16.

For the shield case 4, a cable holding part 19 formed by protruding a part of the main surface portion 15 corresponding to the cable leading part 17 is provided. In the cable holding part 19, a pair of nearly c-shaped notches 20*a* and 20*b* are formed, whereby tongue piece-shaped hold-solder parts 21*a* and 21*b* (hereinafter referred to as a hold-solder part 21) are respectively formed. The hold-solder parts 21 are respectively bent so as to be orthogonal to the main surface portion 15, and their leading-end parts are formed in the shape of an arc as shown in FIG. 5 thereby to constitute cable holding parts 22*a* and 22*b* (hereinafter referred to as a cable holding part 22).

The thus constructed shield case 4 is attached to a combined body of the antenna substrate 5 and the cable substrate 11 by fitting the positioning protrusions 18 into the corresponding positioning holes. By soldering each positioning protrusion 18 to the antenna substrate 5 or the cable substrate 11, the shield case 4 is integrated with the combined body of the antenna substrate 5 and the cable substrate 11 resulting in the antenna unit 1. The shield case 4 covers the electronic parts mounted on the cable substrate 11 and the circuit pattern in this state thereby to perform magnetic shield.

In the antenna unit 1, the earth spring 14 provided for the cable substrate 11 elastically deforms somewhat in this state and comes into contact with the inner surface of the main surface portion 15, whereby the shield case 4 is connected to an earth pattern formed on the cable substrate 11. In the antenna unit 1, each hold-solder part 21 of the shield case 4 is opposed to the coaxial cable 10 in this state, and each cable holding part 22 formed at the leading end or each hold-solder part 21 is rammed against the coaxial cable 10 and presses the coaxial cable 10 on the main surface of the cable substrate 11.

In the antenna unit 1, as described above, the shield case 4 is attached integrally to the antenna substrate 5 and the cable substrate 11. Therefore, by the cable holding part 22, the coaxial cable 10 is prevented from coming up from the cable substrate 11. Further, in the antenna unit 1, as shown in FIG. 1, each hold-solder part 21 of the shield case 4 is subjected to soldering in this state, whereby the coaxial cable 10 is integrated with each hold-solder part 21 and fixed to the shield case 4.

In the antenna unit 1, as described above, the coaxial cable 10 is held by the cable holding part 22 formed in the shield case 4, and the hold-solder part 21 and the coaxial cable 10 are soldered, whereby the coaxial cable 10 is firmly fixed to the shield case 4. Therefore, by preventing increased amounts of power from being applied to the connection part between the coaxial cable 10 and the cable substrate 11. solder is prevented from peeling off even if vibration and shock are applied to the antenna unit 1. Accordingly, reliability is improved.

In the antenna unit 1, the coaxial cable 10 does not come up from the cable substrate 11 and is firmly soldered to the cable substrate 11. In the antenna unit 1, it is not necessary to perform soldering while the coaxial cable 10 and the cable substrate 11 are being pressed and held by use of an appropriate jig, and soldering having high accuracy is performed by easy work.

In the antenna unit 1, the hold-solder part 21 in which the cable holding part 22 is formed is provided on the main surface portion 15 of the shield case 4 and the coaxial cable 10 is fixed and held by the cable holding part 22. In other words, in the antenna unit 1, since the member for fixing and holding the coaxial cable 10 is provided for the main surface portion 15 of the shield case 4, the mounted positions of the electron parts on the antenna substrate 5 and the cable substrate 11, and the connection position of the coaxial cable 10 are not limited to the surrounding portions of the member for fixing and holding the coaxial cable 10 but can be set arbitrarily. Therefore, in the antenna unit 1, parts mounting efficiency is improved and an assembly process is simplified, whereby size-reduction of the antenna unit can be realized.

In the above embodiment, the antenna substrate 5 and the cable substrate 11 are joined to each other, and the shield case 4 is attached on the cable substrate 11 side so as to cover the electron parts mounted on the cable substrate 11. However, for example, the antenna substrate 5 and the cable substrate 11 may be integrated. In the antenna unit in this case, the coaxial cable 10 is connected to the antenna substrate 5 and the shield case 4 is attached.

Further, though the invention is applied to the satellite signal receiving antenna unit in the embodiment, it can be also applied to other antenna units.

As described above in detail, according to the antenna unit of the invention, by the hold-solder part formed in the shield case attached to the antenna substrate so as to cover the mounted parts, the coaxial cable connected to the connection part of the antenna substrate is pressed, and the hold-solder part and the coaxial cable are soldered, whereby the antenna unit is assembled. Therefore, the coaxial cable is soldered and connected to the antenna substrate without using the jig in the state where the coaxial cable does not come up from the antenna substrate, and the coaxial cable is firmly fixed to the shield case in the vicinity of this connection part. Accordingly, according to the antenna unit, the coaxial cable can be firmly connected by the easy process to the antenna substrate in which the connection part is provided in the free position on its main surface, so that reliability is improved and the cost can be reduced.

What is claimed is:

1. An antenna unit comprising:

an antenna board, comprising an antenna unit;

at least one coaxial cable, electrically connected to the antenna unit;

a shield case, attached to the antenna board so as to cover the antenna board and form an inner space, and formed with a first opening through which the coaxial cable is led out, a comprising a projection, extending from an inner face of the shield case and pressing a part of the coaxial cable where the coaxial cable is placed inside the shield case against the antenna board, the projection being soldered with the coaxial cable to fix the coaxial cable to the shield case.

2. The antenna of claim 1, wherein the shield case is formed with a second opening which defines the projection.

3. The antenna unit of claim 1, wherein the antenna board is formed with a first positioning member, and the shield case is formed with a second positioning member, which is fitted with the first positioning member so as to place the projection in a predetermined position relative to the coaxial cable.

4. The antenna unit of claim 1, wherein a plurality of the coaxial cables are provided and bound by a protection tube having thermal shrinking ability at an outside of the shield case.

5. An antenna unit comprising:

an antenna board;

an antenna element mounted on the antenna board;

a shield case attached to the antenna board so as to cover the antenna board;

a coaxial cable electrically connected to the antenna element and extending through the shield case;

an external packaging case housing the antenna element, antenna board and shield case, said external packaging case having an opening through which said coaxial cable is led out of said external packaging case;

a cable protection member made of resin covering only a portion of said coaxial cable and located to extend through the opening and thereby prevent said coaxial cable from directly contacting an inner surface of said opening; and a bush attached to the coaxial cable at a position located within said external packaging case between said antenna board and the opening, wherein said coaxial cable, said cable protection member and said bush are mutually separate structures.

6. The antenna unit of claim 5 wherein the cable protection member is a protection tube having thermal shrinking ability.

7. The antenna unit of claim 5 wherein the cable protection member is extended from a position located between the shield case and the external packaging case to the outside of the external packaging case, while covering the coaxial cable.

8. The antenna unit of claim 5 wherein the external packaging case is comprised of a top cover and a bottom cover, and opening is a cutout formed with the top cover.

9. The antenna unit of claim 5 wherein the bush is made of a resin material.

10. An antenna unit, comprising:

a housing constructed and arranged to form a chamber for enclosing an antenna element, having a structure for mounting said antenna element inside said chamber, and having a clearance hole formed in said housing;

a coaxial cable, electrically connected to the antenna element and extending through said clearance hole; and a cable protection member affixed to said coaxial cable, made of resin and covering only a portion of said coaxial cable, said portion extending through said clearance hole.

* * * * *